United States Patent
Chuang

(10) Patent No.: US 9,467,829 B2
(45) Date of Patent: Oct. 11, 2016

(54) METHOD OF PROCESSING AN SMS MESSAGE FOR PROVIDING A CONTENT SUMMARY AND RELATED COMMUNICATION SYSTEM

(71) Applicant: ACER INCORPORATED, New Taipei (TW)

(72) Inventor: Chia-Yun Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 61 days.

(21) Appl. No.: 14/574,401

(22) Filed: Dec. 18, 2014

(65) Prior Publication Data

US 2016/0037312 A1 Feb. 4, 2016

(30) Foreign Application Priority Data

Aug. 1, 2014 (TW) .............................. 103126461 A

(51) Int. Cl.
*H04W 4/14* (2009.01)
*H04M 1/725* (2006.01)
*H04L 12/58* (2006.01)

(52) U.S. Cl.
CPC .............. *H04W 4/14* (2013.01); *H04L 51/063* (2013.01); *H04M 1/72552* (2013.01); *H04L 51/38* (2013.01); *H04M 1/72569* (2013.01); *H04M 1/72572* (2013.01)

(58) Field of Classification Search
CPC ...................................................... H04W 4/14
USPC ......................................................... 455/466
See application file for complete search history.

(56) References Cited

U.S. PATENT DOCUMENTS

| 6,868,143 B1 | 3/2005 | Menon |
| 2010/0159963 A1* | 6/2010 | Lewis ................. H04L 29/1215 455/466 |
| 2010/0240402 A1 | 9/2010 | Wickman |
| 2011/0131221 A1 | 6/2011 | Bhide |

FOREIGN PATENT DOCUMENTS

CN 101827329 A 9/2010

OTHER PUBLICATIONS

3GPP TS 23.040 V12.1.0 (Sep. 2013), Release 12, p. 50 and p. 71-73.

* cited by examiner

*Primary Examiner* — Christopher M Brandt
(74) *Attorney, Agent, or Firm* — Winston Hsu; Scott Margo

(57) ABSTRACT

When receiving an SMS message which has been handled as a long message, a receiving entity is configured to access one or multiple key contents in the content of the SMS message and provide a corresponding content summary of the SMS message. The source address of the SMS message and the content summary may simultaneously be displayed. When receiving a command to browse the SMS message, the receiving entity is configured to display the content of the SMS message according to the one or multiple key contents. Therefore, the user of the receiving entity can identify the abstract of the SMS message efficiency and the readability of the SMS message can be improved.

7 Claims, 3 Drawing Sheets

METHOD OF PROCESSING AN SMS MESSAGE FOR PROVIDING A CONTENT SUMMARY AND RELATED COMMUNICATION SYSTEM

BACKGROUND OF THE INVENTION

1. Field of the Invention

The present invention is related to a method of processing an SMS message and related communication system, and more particularly, to a method of processing an SMS message for providing a content summary and related communication system.

2. Description of the Prior Art

The short message service (SMS) is a messaging mechanism that enables short messages of generally no more than 140~160 characters in length to be transmitted from, and received by a wireless communications device.

First introduced in the Global System for Mobile Communications (GSM) system, SMS is currently supported by a majority of other digital-based mobile communications systems, such as by Universal Mobile Telecommunications System (UMTS) and Long Term Evolution (LTE) system. The message payload commonly contains plain text, but there are provisions for other types of data, such as pictures, graphics, ring tones, etc.

Unlike paging, SMS messages are stored in and forwarded to SMS centers in an SMS system. The maximum SMS transmission length is determined by the coding scheme of SMS messages, and an SMS message containing more characters than the maximum SMS transmission length is handled as a long message. Most of the currently available wireless communication devices are capable of sending and receiving long messages. More specifically, a long SMS message is automatically segmented into multiple short messages for transmission by a sending entity, and the multiple short messages are automatically concatenated into the original long SMS message by a receiving entity.

According to SMS-related 3rd Generation Partnership Project (3GPP) technical specifications, an SMS message includes a plurality of data fields. When receiving multiple SMS messages, the receiving entity may decode each data field in each SMS message and display the sender and the title of each SMS message on an SMS application interface, thereby allowing the user to select a specific title for reading the detailed content of the corresponding SMS message. Since SMS application interface only provides limited browsing space, the prior art method can only display the first part of the SMS message in its title. Since the main purpose of a long SMS message may not be mentioned in the first part of the long SMS message, the user of the receiving entity may not be able to identify the abstract of the SMS message efficiently from the tile of the SMS message.

SUMMARY OF THE INVENTION

The present invention provides a method of processing an SMS message for providing a content summary. The SMS message is transmitted from a sending entity to a receiving entity. The method includes the receiving entity providing the content summary according to one or multiple key contents when determining that the one or multiple key contents are included in a content of the SMS message; and the receiving entity simultaneously displaying a source address of the SMS message and the content summary before displaying the content of the SMS message.

The present invention also provides a communication system for processing an SMS message for providing a content summary. The communication system includes a network entity and a receiving entity. The network entity is configured to provide a plurality of TPDUs associated with the SMS message. The receiving entity includes a network connectivity unit, a screen and a processing component. The network connectivity unit is configured to receive the plurality of TPDUs from the network entity. The screen is used for simultaneously displaying a source address of the SMS message and the content summary and for displaying the content of the SMS message according to one or multiple key contents. The processing component is configured to fetch information associated with the source address of the SMS message, the content of the SMS message, a length of the SMS message, and a coding scheme of the SMS message from the plurality of TPDUs; determine if the SMS message is handled as a long message based on the length of the SMS message and the coding scheme of the SMS message; and determine if the content of the SMS message includes the one or multiple key contents when determining that the SMS message is handled as the long message; and provide the content summary according to the one or multiple key contents when determining that the one or multiple key contents are included in the content of the SMS message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
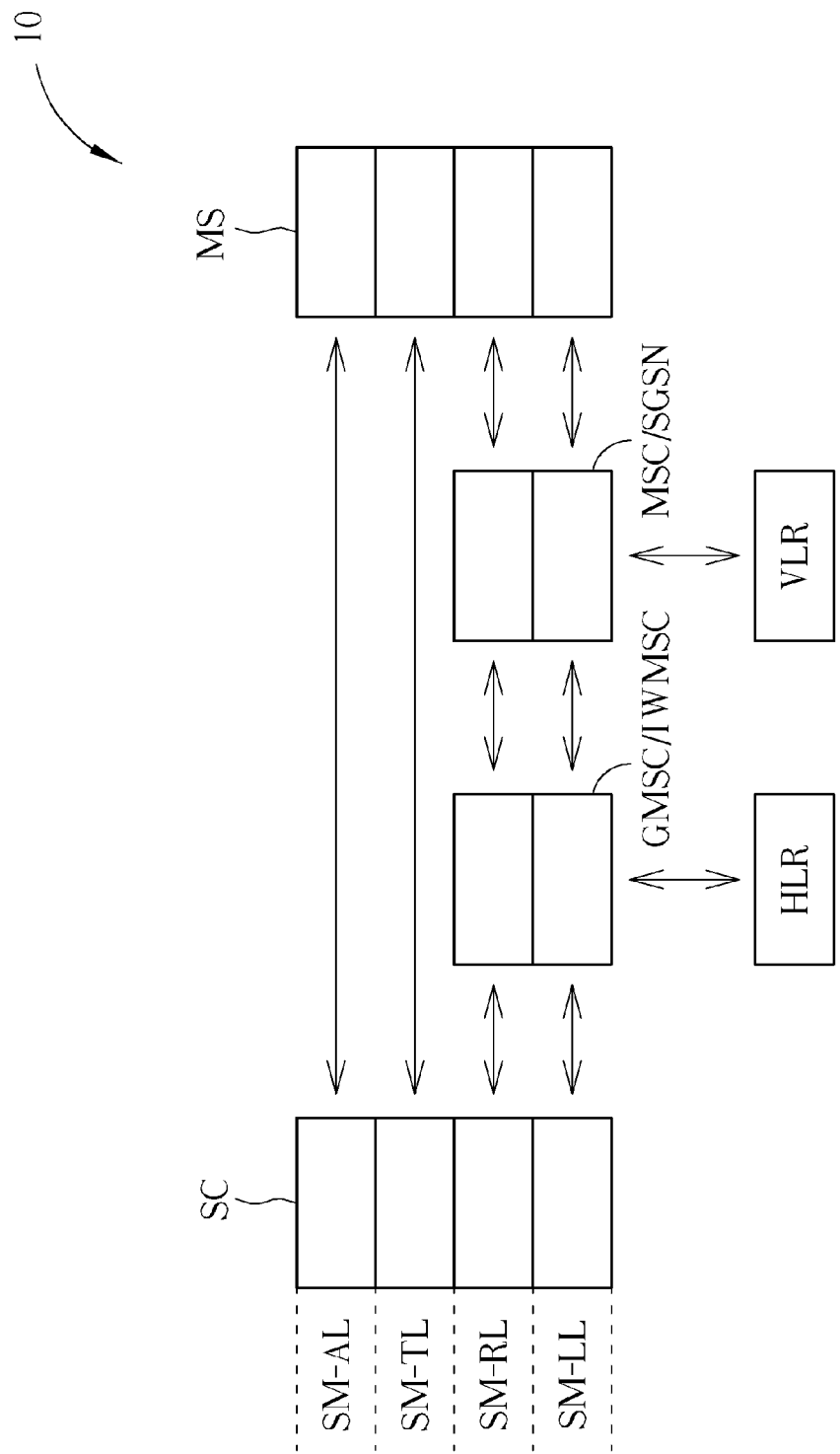
FIG. 1 is a diagram illustrating a network structure and protocol layers of an SMS system according to an embodiment of the present invention.

FIG. 1 is a diagram illustrating a network structure and protocol layers of an SMS system 10 according to an embodiment of the present invention. The SMS system 10 includes an SMS center SC, a receiving entity MS and a plurality of SMS network entities, such as a mobile switch center MSC, a serving general packet radio service (GPRS) support node SGSN, a gateway mobile switch center GMSC, an interworking mobile switch center IWMSC, a home location register HLR, and a visitor location register VLR.

The transmission of SMS messages is mainly controlled by the SMS center SC, a sending entity (not shown) and the receiving entity MS, while the above-mentioned SMS network entities are responsible for relaying information associated with SMS messages. The home location register HLR and the visitor location register VLR are databases that contain the mobile subscriber information.

In the present invention, the SMS center SC is configured to submit an SMS message to a receiving entity, retain the responsibility of the SMS message until the report has been received or the validity period expires, receive a report from a public land mobile network (PLMN), receive an SMS message from a sending entity, and return a report to the PLMN for a previously received SMS message. The SMS center SC may be implemented on high-speed server platforms in order to provide scalable, reliable and highly available store-and-forward service for SMS messages. The SMS center SC may also support transmission control protocol (TCP)/Internet protocol (IP) access or data protocols, such as wireless application protocol (WAP). However, the type of the SMS center does not limit the scope of the present invention.

SMS messages sent from a sending entity are known as Mobile Originated (MO), and SMS messages sent to a receiving entity are known as Mobile Terminated (MT). The present invention focuses on the MT case. As used herein, the "receiving entity" and the "sending entity" may include transportable electronic devices such as mobile telephones, personal digital assistants, handheld, tablet, nettop, or laptop computers, or other devices with similar telecommunication capabilities. In other cases, the "receiving entity" and the "sending entity" may include non-transportable devices with similar telecommunications capabilities, such as desktop computers, set-top boxes, or network appliances. The "receiving entity" and the "sending entity" may also include any hardware or software component that can terminate a communication session for a user. As well-known to those skilled in the art, the term "entity" may also be referred to "mobile device", "mobile station", "user equipment", "UE", and the like. Also, the type of the receiving entity does not limit the scope of the present invention.

Figure 2:
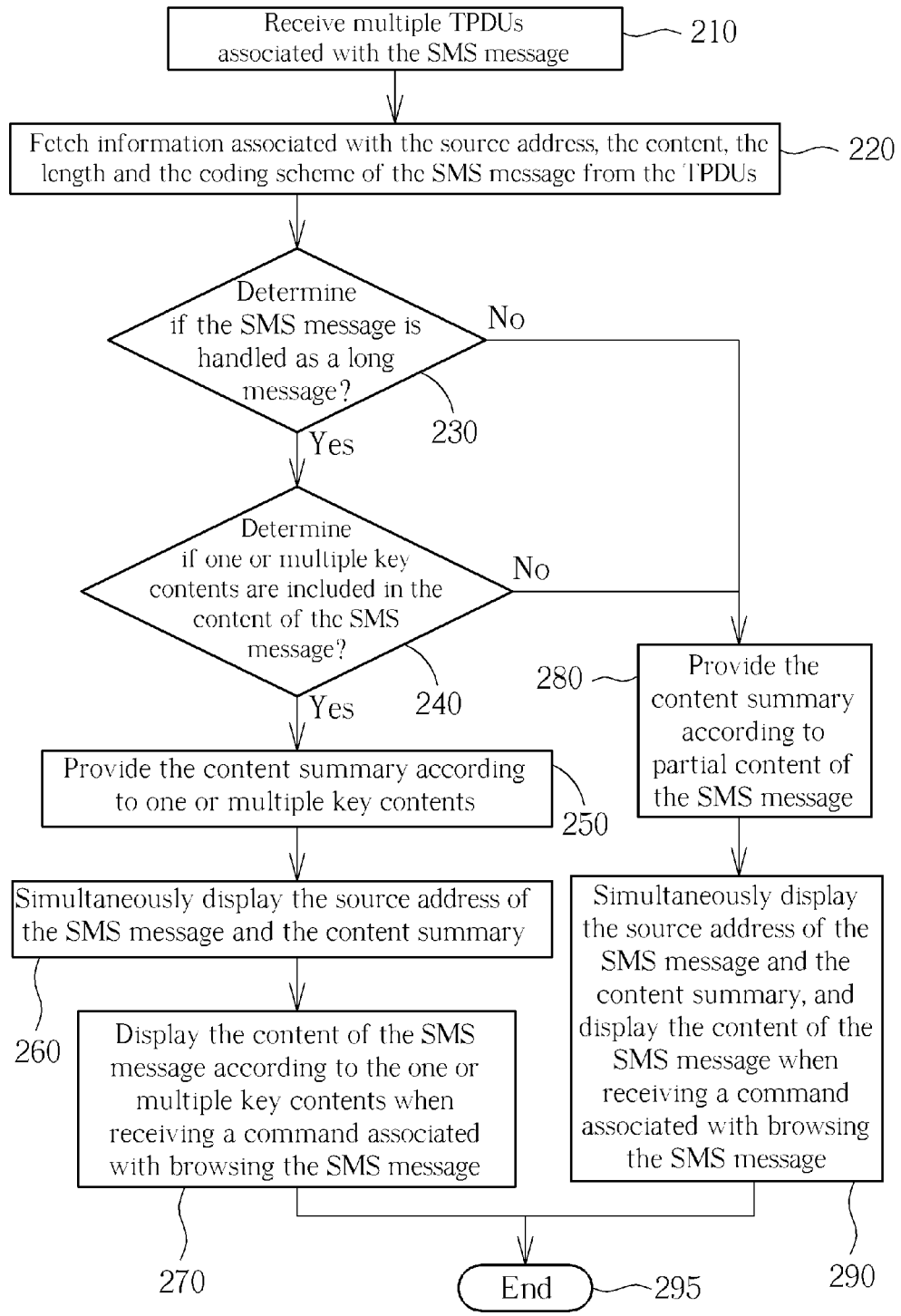
FIG. 2 is a flowchart illustrating a method of processing an SMS message for providing a content summary according to an embodiment of the present invention.

FIG. 2 is a flowchart illustrating a method of processing an SMS message for providing a content summary according to an embodiment of the present invention. The flowchart of FIG. 2 includes the following steps:

Step 210: the receiving entity receives a plurality of transport protocol data units (TPDUs) associated with the SMS message from an SMS center; execute step 220.

Step 220: the receiving entity fetches information associated with the source address of the SMS message, the content of the SMS message, the length of the SMS message, and the coding scheme of the SMS message from the plurality of TPDUs; execute step 230.

Step 230: the receiving entity determines if the SMS message is handled as a long message based on the length of the SMS message and the coding scheme of the SMS message; if yes, execute step 240; if no, execute step 280.

Step 240: the receiving entity determines if one or multiple key contents are included in the content of the SMS message; if yes, execute step 250; if no, execute step 280.

Step 250: the receiving entity provides the content summary according to one or multiple key contents; execute step 260.

Step 260: the receiving entity simultaneously displays the source address of the SMS message and the content summary on a screen; execute step 270.

Step 270: the receiving entity displays the content of the SMS message according to the one or multiple key contents when receiving a command associated with browsing the SMS message; execute step 295.

Step 280: the receiving entity provides the content summary according to the first part in the content of the SMS message; execute step 290.

Step 290: the receiving entity simultaneously displays the source address of the SMS message and the content summary on a screen, and displays the content of the SMS message when receiving a command associated with browsing the SMS message; execute step 295.

Step 295: end.

An SMS message is sent over the network as encoded data known as SMS protocol data unit (PDU) between corresponding layers of two SMS network entities. The SMS protocol includes four layer: short message application layer (SM-AL), short message transport layer (SM-TL), short message relay layer (SM-RL), and short message link layer (SM-LL). Detailed operations and structures of the four layers in the SMS protocol are provided in SMS-related 3rd Generation Partnership Project (3GPP) technical specifications, such as TS 23.040. Therefore, only the related information of the SM-TL and the SM-RL are mentioned in the present disclosure.

The SM-TL provides a service to the SM-AL. This service enables the SM-AL to transfer short messages to its peer entity, receive short messages from its peer entity and receive reports about earlier requests for short messages to be transferred. The SM-TL communicates with its peer entity with the following six transport PDUs (TPDUs): SMS-DELIVER TPDU, SMS-STATUS-REPORT TPDU, SMS-DELIVER-REPORT TPDU, SMS-COMMAND TPDU, SMS-SUBMIT TPDU, and SMS-SUBMIT-REPORT TPDU.

In step 210, the receiving entity is configured to receive the above-mentioned TPDUs associated with the SMS message from the SMS center or the network entities GMSC/IWMSC. In step 220, the receiving entity is configured to fetch the information associated with the source address of the SMS message, the content of the SMS message and the length of the SMS message from the SMS-DELIVER TPDU. According to SMS-related 3GPP technical specifications (such as TS 23.040), the source address of the SMS message is encoded in a data field known as Transfer-Protocol-Originating-Address (TP-OA) field of the SMS-DELIVER TPDU, the content of the SMS message is encoded in a data field known as Transfer-Protocol-User-Data (TP-UD) field of the SMS-DELIVER TPDU, the length of the SMS message is encoded in a data field known as Transfer-Protocol-User-Data-Length (TP-UDL) field of the SMS-DELIVER TPDU, and the coding scheme of the SMS message is encoded in a data field known as Transfer-Protocol-Data-Coding-Scheme (TP-DCS) field of the SMS-DELIVER TPDU.

In step 230, the receiving entity is configured to determine if the SMS message is handled as a long message based on the length of the SMS message and the coding scheme of the SMS message. According to the TP-DCS field of the SMS-DELIVER TPDU, the receiving entity may be informed of the coding scheme of the SMS message, such as GSM 7-bit default alphabet or 2-byte universal character set (UCS-2). According to the TP-UDL field of the SMS-DELIVER TPDU, the receiving entity may be informed of the length of the SMS message. For data encoded with GSM 7-bit default alphabet, the maximum TP-UD capacity is 140 bytes. For data encoded with UCS-2, the maximum TP-UD capacity is 70 bytes. If the length of the SMS message exceeds the maximum TP-UD capacity associated with its coding scheme, the sending entity needs to segment the SMS message into multiple short messages, each of which does not exceed the corresponding maximum TP-UD capacity, before transmission. Then, the receiving entity may concatenate these short messages and display the original long SMS message.

If it is determined in step 230 that the SMS message is handled as a long message, step 240 may then be executed for determining if one or multiple key contents are included in the content of the SMS message. Each of the one or multiple key contents may be associated with a name, a salutation, time, a location, a transportation means, or at least one user-defined keyword.

In an embodiment when the one or multiple key contents are associated with a name and/or a salutation, the receiving entity may determine if the content of the SMS message includes a contact name or a contact number stored in the phonebook of the receiving entity, a family salutation (such as Mom or Dad), and/or a business salutation (such as Doctor A or President B).

In an embodiment when the one or multiple key contents are associated with time, the receiving entity may determine if the content of the SMS message includes one or multiple time-related terms including, but not limited to, "year", "month", "day", "hour", "minute", "second", "tomorrow", "today", yesterday", morning", "noon", "afternoon", "AM", and/or "PM".

In an embodiment when the one or multiple key contents are associated with a location, the receiving entity may determine if the content of the SMS message includes a specific city or a specific town. For example, if the receiving entity is inserted with a subscriber identity module (SIM) card issued in Country A, it may be determined in step 240 if the content of the SMS message includes a specific city of Country A. Or, if the receiving entity last performed satellite positioning in City B or performs satellite positioning most frequently in City B, it may be determined in step 240 if the content of the SMS message includes a specific town of City B.

In an embodiment when the one or multiple key contents are associated with a transportation means, the receiving entity determines may if the content of the SMS message includes transportation-related terms including, but not limited to, "train", "bus", "day", "metro", and/or "plane".

In an embodiment when the one or multiple key contents are associated with at least one user-defined keyword, the receiving entity determines may if the content of the SMS message includes one or multiple user-defined keywords which have been input by the user. The one or multiple user-defined keywords may be associated with any of a name, a salutation, a date, time, a location, a transportation means, or other topics.

In the embodiment of the present invention, the one or multiple key contents may be set by the user or may be determined according to how the user uses the receiving entity. However, the number, the type, the determination or the content of the one or multiple key contents does not limit the scope of the present invention.

In step 250, the receiving entity is configured to provide the content summary according to the one or multiple key contents. In step 260, the receiving entity is configured to simultaneously display the source address of the SMS message and the content summary on the screen. For example, it is assumed that the source address of the SMS message acquired in step 210 is "ABC" and the content of the SMS message acquired in step 210 is "Had a fight with my dad. Having bad mood. XXX. Can we meet up later? How about 9 PM in front of Taipei Train Station? We can watch a live football game later". "ABC" may be a contact name or a contact number stored in the phonebook of the receiving entity. "XXX" represents the detailed description of how the user argued with his dad, with which the SMS message is determined to be a long message in step 230. If the key contents associated with a location, a transportation means, time and a user-defined "football game" are adopted in step 240, the receiving entity may provide the content summary of "Taipei Train Station/9PM/football game" in step 250 and simultaneously display the source address of the SMS message and the content summary on the screen in step 260. Therefore, the user may search the keyword of interest by browsing the content summaries of all received SMS messages.

In step 270, the receiving entity is configure to display the content of the SMS message according to the one or multiple key contents when receiving a command associated with browsing the SMS message. For example, the receiving entity may display the content of the SMS message as "Had a fight with my dad. Having bad mood. XXX. Can we meet up later? How about 9 PM in front of the Taipei Train Station? We can watch a live football game later", wherein "9 PM", "Taipei Train Station" and "football game" are highlighted. For example, the one or multiple key contents of the SMS message may be highlighted by being displayed in a specific color, in a specific format or with a specific display effect. Therefore, the user may locate the keyword of interest more easily when browsing the content of each SMS message.

If it is determined in step 230 that the SMS message is not handled as a long message or it is determined in step 240 that the one or multiple key contents are not included in the content of the SMS message, the receiving entity is configured to provide the content summary according to the first part in the content of the SMS message. Next, step 290 may be executed for simultaneously displaying the source address of the SMS message and the content summary on a screen, and for displaying the content of the SMS message when receiving a command associated with browsing the SMS message.

Figure 3:
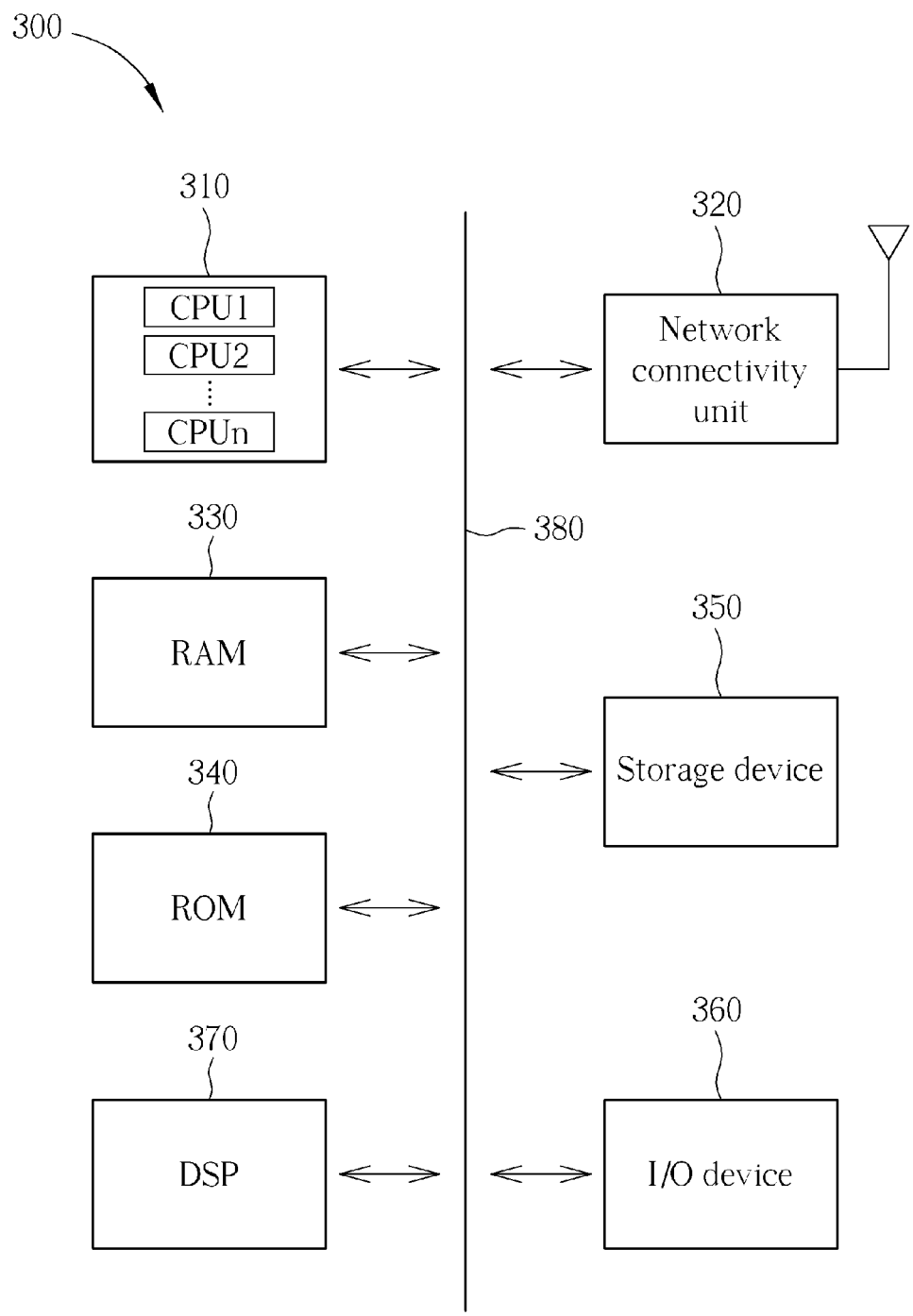
FIG. 3 is a functional diagram illustrating a communication system according to an embodiment of the present invention.

FIG. 3 is a functional diagram illustrating a communication system 300 which may be used in the sending entity or the receiving entity for carrying out the present method. The communication system 300 includes a processing component 310, a network connectivity unit 320, random access memory (RAM) 330, read only memory (ROM) 340, a storage device 350, an input/output (I/O) device 360, and a digital signal processor (DSP) 370. These components might communicate with one another via a bus 380. In some cases, some of these components may not be present or may be combined in various combinations with one another or with other components not shown. These components might be located in a single physical entity or in more than one physical entity. Any actions described herein as being taken by the processing component 310 may be taken by the processing component 310 alone or by the processing component 310 in conjunction with one or more components shown or not shown in the drawing, such as with the DSP 370. Although the DSP 370 is shown as a separate component, the DSP 370 might be incorporated into the processing component 310.

The processing component 310 is configured to execute instructions, codes, computer programs, or scripts which may be accessed from the network connectivity units 320, RAM 330, ROM 340, or the storage device 350. The processing component 310 may include one or multiple processors CPU1~CPUn for executing the present method simultaneously, serially, or otherwise by one processor. However, the type of the processing component 310 does not limit the scope of the present invention.

The network connectivity unit 320 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM/UMTS/LTE radio transceiver devices, worldwide interoperability for microwave access (WiMAX) devices, and/or other well-known devices for connecting to other network entities. The network connectivity unit 320 allows the processing component 310 to communicate with the Internet or one or more telecommunications networks. However, the type of the network connectivity unit 320 does not limit the scope of the present invention.

The RAM 330 may be used to store volatile data and instructions that are executed by the processing component 310. The ROM 340 may be used to store instructions and data that are read during execution of the instructions. The storage device 350 may include various disk-based systems such as hard disk, floppy disk, or optical disk and may be used to store programs that are loaded into the RAM 330 when such programs are selected for execution. Access to both the RAM 330 and the ROM 340 is typically faster than access to the storage device 350, but the storage device 350 can provide larger memory capacity. However, the type of the RAM 330, ROM 340 or the storage device 350 does not limit the scope of the present invention.

The I/O devices 360 may include one or more of liquid crystal display (LCD) screens, touch screen displays, keyboards, keypads, switches, dials, mice, track balls, voice recognizers, card readers, paper tape readers, printers, video monitors, or other well-known input/output devices. The I/O devices 360 may be used for displaying the source address of the SMS message and the content summary in steps 260 and 290 or displaying the content of the SMS message in steps 270 and 290. However, the type of the I/O devices 360 does not limit the scope of the present invention.

In the present invention, when receiving an SMS message which has been handled as a long message, a receiving entity is configured to access one or multiple key contents in the content of the SMS message and provide a corresponding content summary of the SMS message. The source address of the SMS message and the content summary may simultaneously be displayed. When receiving an instruction to browse the SMS message, the receiving entity is configured to display the content of the SMS message according to the one or multiple key contents. Therefore, the user of the receiving entity can identify the abstract of the SMS message efficiency and the readability of the SMS message can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of processing a short message service (SMS) message for providing a content summary, the SMS message being transmitted from a sending entity to a receiving entity, the method comprising:
   the receiving entity receiving a plurality of transport protocol data units (TPDUs) associated with the SMS message;
   the receiving entity fetching information associated with a source address of the SMS message, a content of the SMS message, a length of the SMS message, and a coding scheme of the SMS message from the plurality of TPDUs;
   the receiving entity determining if the SMS message is handled as a long message based on the length of the SMS message and the coding scheme of the SMS message;
   the receiving entity determining if the content of the SMS message includes one or multiple key contents after determining that the SMS message is handled as the long message;
   the receiving entity providing the content summary according to the one or multiple key contents when determining that the one or multiple key contents are included in the content of the SMS message; and
   the receiving entity simultaneously displaying a source address of the SMS message and the content summary before displaying the content of the SMS message.

2. The method of claim 1, wherein each key content is associated with a name, a salutation, a date, time, a location, a transportation means, or a keyword defined by a user.

3. The method of claim 1, further comprising:
   determining the one or multiple key contents according to how a user uses the receiving entity.

4. The method of claim 1, further comprising:
   a user of the receiving entity setting the one or multiple key contents.

5. The method of claim 1, further comprising:
   the receiving entity displaying the content of the SMS message according to the one or multiple key contents after receiving a command associated with browsing the SMS message.

6. The method of claim 5, further comprising:
   the receiving entity displaying the content of the SMS message according to the one or multiple key contents by displaying the one or multiple key contents in a specific color, in a specific format or with a specific display effect when displaying the content of the SMS message.

7. A communication system for processing a short message service (SMS) message for providing a content summary comprising:
   a network entity configured to provide a plurality of transport protocol data units (TPDUs) associated with the SMS message; and
   a receiving entity including:
      a network connectivity unit configured to receive the plurality of TPDUs from the network entity;
      a screen for simultaneously displaying a source address of the SMS message and the content summary and for displaying the content of the SMS message according to one or multiple key contents; and
      a processing component configured to:
         fetch information associated with the source address of the SMS message, the content of the SMS message, a length of the SMS message, and a coding scheme of the SMS message from the plurality of TPDUs;
         determine if the SMS message is handled as a long message based on the length of the SMS message and the coding scheme of the SMS message; and
         determine if the content of the SMS message includes the one or multiple key contents when determining that the SMS message is handled as the long message; and
         provide the content summary according to the one or multiple key contents when determining that the one or multiple key contents are included in the content of the SMS message.

* * * * *